1,009,290.

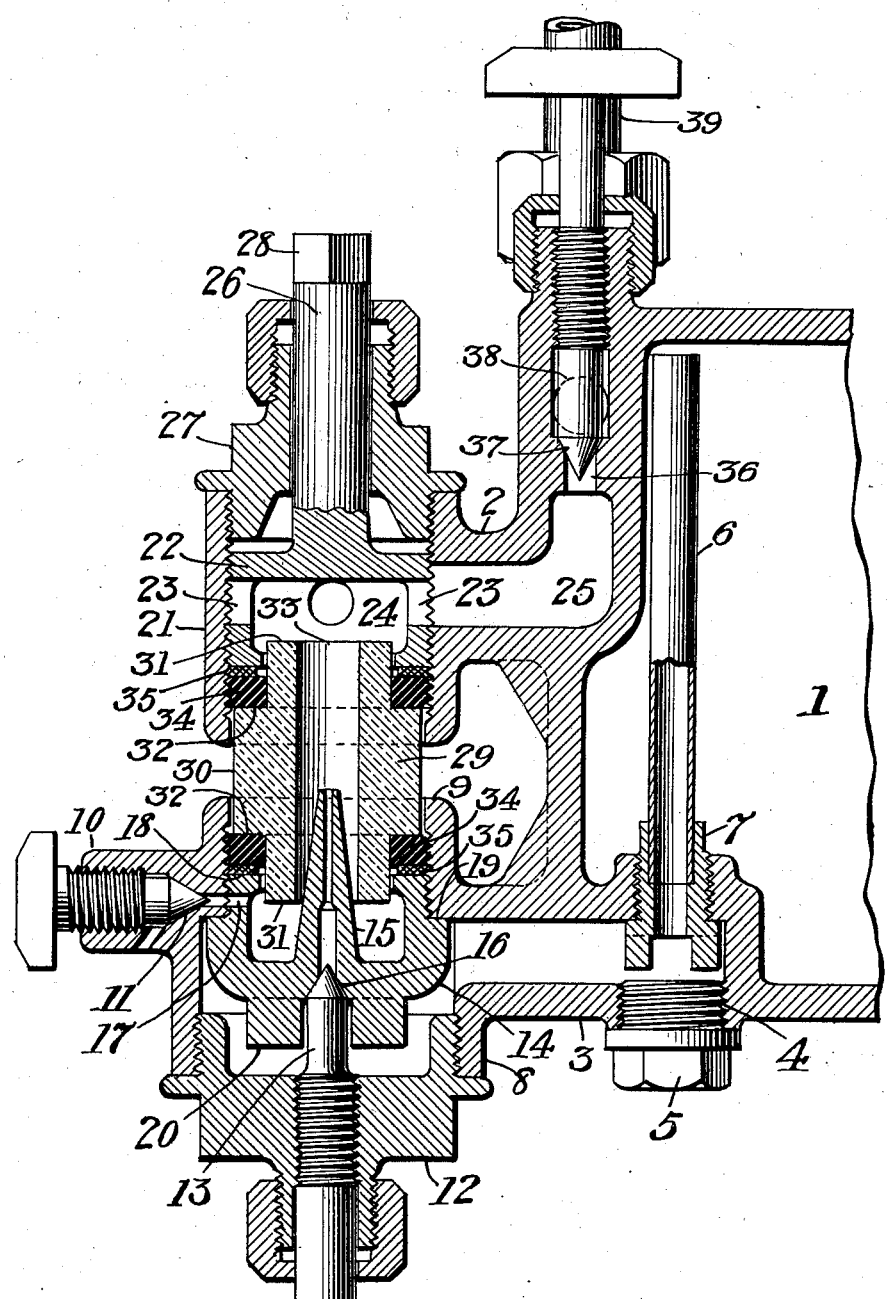

UNITED STATES PATENT OFFICE.

FRANK W. EDWARDS, OF LOGANSPORT, INDIANA, ASSIGNOR TO THE CHICAGO LUBRICATOR COMPANY, OF CHICAGO, ILLINOIS, A CORPORATION OF ILLINOIS.

SIGHT-FEED ATTACHMENT FOR LUBRICATORS.

Specification of Letters Patent. Patented Nov. 21, 1911.

Application filed August 24, 1908. Serial No. 450,095.

*To all whom it may concern:*

Be it known that I, FRANK W. EDWARDS, a citizen of the United States, residing at Logansport, in the county of Cass and State of Indiana, have invented a certain new and useful Improvement in Sight-Feed Attachments for Lubricators, of which the following is a full, clear, and exact description.

An essential requirement in a sight-feed lubricator is that it shall permit such observations of the feed that the operator may determine whether the lubricator is feeding with the required regularity. To this end sight-feed lubricators have always been constructed with sight-feed chambers through which the oil passes drop by drop, the whole or some portion of the walls of these chambers being of glass. These glasses are usually called "observation glasses" and have been of two general types. In one of these types the glass is in the form of a tube of uniform diameter and having walls of uniform thickness, the oil passing through the tube. It is highly important that the sight-feed chamber should be so located as to be readily observable from various points of view about the lubricator, and more important still that its interior should be subjected to light and that its interior should be illuminated by the light coming from various directions and passing through the transparent walls of the chamber. This facility of observation has been secured in the old well-known tubular glass which is held at its ends in supporting arms usually provided with packing. While this form of glass was ideal in that it was so placed that the feed of oil could be observed from various positions, and also in that it permitted the light to enter the chamber from various directions thus affording perfect illumination on the lubricator, yet it has certain inherent and radical defects which have never been overcome and for which heretofore no remedy has been proposed. These defects arose from the frequent breakage due to the fragile character of the tube itself, no such glass having been heretofore constructed of sufficient strength to withstand the internal steam pressures and the strains due to the variation of temperature and the getting out of line of the mountings. These glasses frequently broke, thus putting the lubricator out of service, and the danger from flying particles of glass was so serious as to cause the use of wire guards around the glasses, thus adding to the expense and interfering with ready observation. The other type of glasses is known as the bull's-eye. These glasses are invariably mounted in pockets, usually of metal, and fitted into the side walls of the sight-feed chambers. These glasses are solid and usually of greater axial length than diameter. The pockets or chambers containing the glasses are usually arranged in pairs, being placed in line with each other on opposite sides of the sight-feed chamber. These glasses largely overcome the liability of breakage, but they do not afford ready observation from different points, having, in fact, only small areas exposed to the light, and being for the most part surrounded by solid walls; and they cannot always be so placed as to permit the light to enter through both glasses or from opposite sides of the chamber. Further these glasses are so thick and their exposed areas so limited that they do not afford good illumination, and with turbid water the feed of the oil cannot be observed readily. These objections are so pronounced that it is generally recognized that the bull's-eye type of glass affords less facility for correct observation of the feed of the oil than the tubular glass, but these bull's-eyes have been and are used because of their avoidance of the objections to tubular glasses above stated.

In three concurrent cases Patents Nos. 952,611 and 952,515, and application Serial No. 450,096 I have shown a number of reinforced observation glasses which secure all of the advantages, without the defects, of both forms of glasses just referred to; that is to say, they insure complete illumination of the sight-feed, permit perfect observation, and combine strength and safety.

The present invention consists of a mounting for these glasses whereby the whole of their central thick-walled portion is exposed unobstructedly, and in carrying out the invention the upper and lower feed-arms of the lubricator oil-bowl are provided with flanges projecting therefrom in opposite directions and having a clear space between their adjacent edges, the observation glass being supported at opposite ends within these flanges and exposed to the light clear around in the space between said adjacent ends, and held in place fluid-tight by an adjustable follower in one of the feed-arms and suitable packing.

In the accompanying drawing, illustrating the invention, the view is a vertical section of one end of a lubricator of approved construction, with the upper and lower feed-arms constructed to serve as such and also as a mounting for the sight-feed glass.

The oil-bowl 1 may be of approved construction and shape, and provided with any desired number of sight-feeds. For purposes of illustration it is supposed to be sufficient to describe the invention as applied to the feed-arms at one end of the oil-bowl, and which may be utilized to feed the lubricant to one of the engine cylinders.

The upper feed-arm 2 and the lower feed-arm 3 are, preferably, cast with the oil-bowl. In the lower feed-arm is a bottom opening 4 closed by a plug 5. Through this opening is inserted into the oil-bowl the oil feed pipe 6 which is supported in a tubular nut 7 screwed into the upper wall of the lower feed-arm. The outer end of the lower feed-arm is made with a downwardly extending annular flange 8 and with an alined upwardly extending annular flange 9 of smaller diameter than the flange 8, and it is also made with a drainage nipple 10 having a valve 11 by which the contents of the sight-feed may be drawn off whenever desired, as in renewing or repairing any of its parts. The flange 8 is internally screw-threaded and provided with a hub 12 in which is mounted the oil-feed controlling-valve 13. The flange 9 also is internally screw-threaded, and receives and supports the oil feed-tip cup 14, which includes the tip proper 15, seat 16 for the feed-valve 13, a drainage hole or holes 17 communicating with the drainage nipple 10, and a packing-sustaining rim 18. This cup is inserted through the opening surrounded by the flange 8 and is screwed into the flange 9 until its shoulder 19 comes into contact with the upper wall of the lower feed-arm adjacent to and forming the bottom of the smaller flange 9. This contact of the shoulder 19 with the upper wall of the lower feed-arm serves to form a tight joint, preventing the escape of the oil from the bowl when the valve 13 is closed and the glass is removed. For purposes of inserting and removing the cup its bottom may be provided with lugs or other projections 20 to receive a wrench or other operating tool.

The upper feed-arm has annular flanges of like diameter projecting above and below and at right angles to it and constituting a socket 21, which is internally screw-threaded. In this socket is a screw follower 22 perforated transversely at 23 and chambered centrally at 24 to register respectively with the steam and oil passage 25 and the sight-feed glass. This follower has an operating stem 26 projecting up through a hub 27 which closes the upper end of the upper feed-arm socket 21, and said stem is squared at 28 or otherwise constructed to facilitate the operation of the follower.

The reinforced observation glass may be of any of a variety of forms embodying the principle of a relatively thick central portion, ends reduced to receive packing-rings, and a central longitudinal oil passage, and one such form is herein shown at 29 as having a central portion 30 thicker than its ends 31 and with shoulders 32 at the meeting points of center and ends, and with a central longitudinal oil passage 33. These shoulders receive the gaskets 34 and next to the gaskets and between them and the adjacent metal of the rim 18 and of the follower are buffer washers 35 which last prevent the metal from cutting into the gaskets.

The glass is inserted by removing hub 27 and the follower 22, placing a buffer washer and then a gasket on the cup, then inserting the glass through the socket 21 on top of said gasket, then putting a gasket on the upper shoulder of the glass, then a buffer washer, and then screwing in the follower 22 and hub 27 until the follower exerts enough pressure to cause the gaskets to close all joints, steam, water and oil tight.

The passage 25 leads to a port 36 controlled by a valve 37 and next to this port is the passage 38 which opens to the steam pipe 39 and to the oil connection with the part to be lubricated through the sight-feed. Hence, if the sight-feed is to be dismembered or is broken, it may be entirely cut out by closing the valves 37 and 13 and draining it of its contents through parts 17, 11 and 10 as described.

A peculiarity of this construction is that the exposed portion of the observation glass is wholly unobstructed, the glass being wholly exposed between the lower edge of the upper feed-arm socket 21 and the upper edge of the lower feed-arm's upper flange, and hence the illumination of the glass is complete and the facility of observation of the feed increased. It is to be noted that the downwardly extending flange of the upper feed-arm socket and the upwardly extending flange of the lower feed-arm approach each other closely, so as to form in effect a protecting case for the glass, with a clear space between them at about the level of the feed-tip, so that the escape of the globule of oil from the tip may be readily seen.

The construction herein described while specially designed for use with reinforced observation glasses of the kind specified, is capable of use with some forms of tubular glasses also.

While I have shown and described the follower 22 as screwthreaded in order to render it movable and adjustable in its socket, it is to be understood that the invention is not limited to this construction. It is essential, however, that the movement and adjustability of the follower should be effected by such means as will hold in use.

What I claim is: —

In a sight-feed attachment for lubricators, the combination with the oil-bowl, of upper and lower feed-arms made integral therewith, the upper feed-arm provided with a socket having a depending flange, a follower arranged in said socket, a feed-tip cup removably fitted in the upper wall of the lower feed-arm and provided with a packing-sustaining rim having a shoulder seating fluid-tight against the adjacent wall of the lower feed-arm, a flange on the lower feed-arm, an observation-glass arranged within the flanges and between the follower and the rim of the cup and having a clear and unobstructed exposure between the adjacent edges of the flanges, and an independent removable hub fitted in the lower feed-arm beneath the cup to permit the insertion and removal of said cup.

In testimony whereof I have hereunto set my hand this 21st day of August A. D. 1908.

FRANK W. EDWARDS.

Witnesses:
WILLIAM S. FURRY,
GEORGE M. DICKSON.

Copies of this patent may be obtained for five cents each, by addressing the "Commissioner of Patents, Washington, D. C."